Patented Nov. 20, 1945

2,389,582

UNITED STATES PATENT OFFICE 2,389,582

COMPOUNDS OF 2-SULPHANILAMIDO-5-CARBOXYTHIAZOLE WITH VASOCONSTRICTORS AND THEIR SOLUTIONS

Philip S. Winnek and Earl R. Bockstahler, Indianapolis, Ind., assignors to Allied Laboratories, Inc., Kansas City, Mo., a corporation of Delaware No Drawing. Application August 2, 1943,
Serial No. 497,044

13 Claims. (Cl. 167—65)

In the last few years sulphanilamide and its derivatives have to a great extent revolutionized the treatment of many serious bacterial infections. The spectacular results obtained when these drugs were administered internally prompted many clinicians to apply them locally, thus producing a greater concentration at the site of infection. Favorable results reported in the healing of infected wounds, compound fractures, and many other conditions, have led to the attempted use of these drugs for the local treatment of the nose and paranasal sinuses.

Saturated solutions of sulphanilamide for the treatment of sinusitis have been tried with some success, but the low solubility and weak chemotherapeutic activity of this compound against many common pathogenic organisms leaves much to be desired.

Solutions of greater strength and chemotherapeutic activity have been made available by the introduction of sodium salts of sulphathiazole, sulphadiazine and sulphapyridine, which are readily soluble in distilled water. However, these drugs are highly alkaline and have been found to cause extensive damage to the nasal and other mucosa.

In most cases the use of a vasoconstrictor in conjunction with sulphanilamide derivatives would appear to offer advantages for the relief of nasal congestion and assure the accessibility of the entire nasal cavity to the solution.

The present invention discloses a class of salts and solutions prepared from said salts which have properties that make them particularly advantageous for the treatment of infections of the nose and paranasal sinuses, and other mucosa infections. Thes salts have the desired chemotherapeutic effects and are soluble under conditions which do not produce the damaging action to the membrane and mucosal tissue, as do the alkaline sulphonamide compounds previously mentioned.

2-sulphanilamido-5-carboxythiazole is a fairly acidic compound that possesses a chemotherapeutic activity of the same order of magnitude as sulphathiazole. It readily forms salts with the common mucosa shrinking agents which are readily soluble in aqueous solutions and normally possessing a pH of greater than 4. These solutions are stable and possess chemotherapeutic activity and the desirable mucosa shrinking property. They are also much less toxic than any previous preparation.

It is desirable to have 2-sulphanilamido-5-carboxythiazole in higher concentrations (2% to 20%), than those ordinarily used for the vasoconstrictor or shrinking agent (0.05% to 3%).

It will therefore be necessary to have an excess of the sulphonamide present over that required to form the salts with the vasoconstrictor.

The excess of 2-sulphanilamido-5-carboxythiazole may be neutralized and made readily water soluble by additions of an alkali metal hydroxide (sodium hydroxide). The solution will then contain the alkali metal salt of 2-sulphanilamido-5-carboxythiazole in concentrations up to 20% and the salts of 2-sulphanilamido-5-carboxythiazole and the vasoconstrictor in concentrations from 0.05% to 8%.

For example, ephedrine is frequently employed as a nasal mucosa shrinking agent as a 3% solution of its hydrochloride, which solution will contain 2.46% of ephedrine. Approximately 8% solution of the salts of 2-sulphanilamido-5-carboxythiazole and ephedrine is required to give 2.46% concentration of ephedrine in the solution. However, lesser concentrations of ephedrine are also used clinically as for example 1%. A solution containing 3% of the salts of 2-sulphanilamido-5-carboxythiazole and ephedrine will furnish the 1% concentration. If a 5% 2-sulphanilamido-5-carboxythiazole concentration is desired it will therefore be necessary to have an additional 3% of this substance present in the form of an alkali metal salt. The addition of alkali may be so regulated as to bring the solution to a selected pH for example from 4 to 8.5.

It may also be of advantage to add to the solution small amounts of preserving agents such as phenol, sodium sulphite, and the like, and/or substances having synergistic action with the sulphonamide, such as urea, N,N'-dichloroazodicarbonamidine and substances having a synergistic action with the mucosa shrinking agent, such as menthol and eucalyptol.

*Example 1*

Salts of ephedrine and 2-sulphanilamido-5-carboxythiazole

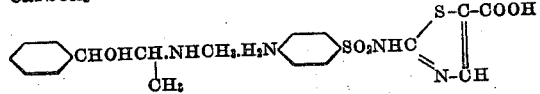

5.5 parts of ephedrine alkaloid (anhydrous) and 10 parts of 2-sulphanilamido-5-carboxythiazole are weighed out and dissolved in 20 parts of water. The resulting solution is filtered and the water removed by placing in a vacuum desiccator over sulphuric acid. The product first turns to a thick gum which on further drying and rubbing with a glass rod changes to a white crystalline material. It is very hygroscopic and extremely soluble in water. Its aqueous solution has a weak acidic reaction.

Example 2

Salts of α-hydroxy-β-amino-propyl benzene and 2-sulphanilamido-5-carboxythiazole

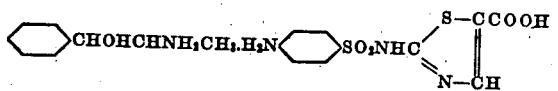

5 parts of α-hydroxy-β-aminopropyl benzene and 10 parts of 2-sulphanilamido-5-carboxythiazole are weighed out and 30 parts of water are added. A considerable part of the solids dissolve and then in a short time the amount of precipitate increases. The mixture is heated to boiling and sufficient hot water is added to cause complete solution. The hot solution is filtered and on cooling the white crystalline salts of α-hydroxy-β-aminopropylbenzene and 2-sulphanilamido-5-carboxythiazole separates out. It may be further purified by crystallization from hot water using activated charcoal to remove impurities. After purification the product melts with decomposition at 165°–166° C.

Example 3

Salts of desoxyephedrine and 2-sulphanilamido-5-carboxythiazole

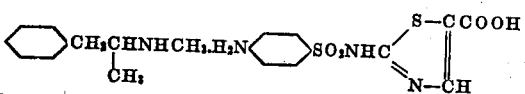

5 parts of 2-sulphanilamido-5-carboxythiazole and 2.5 parts of desoxyephedrine are mixed and 30 parts of water are added. The reaction mixture becomes quite warm and all of the solid material dissolves. The solution is evaporated in a vaccum desiccator over sulphuric acid and the salt of desoxyephedrine and 2-sulphanilamido-5-carboxythiazole is obtained as a viscous tar which on scratching with a glass rod and further drying turns to a white crystalline solid. The product is very hygroscopic and is readily soluble in water and its aqueous solution has a weakly acidic reaction.

Example 4

Salts of β-aminopropylbenzene and 2-sulphanilamido-5-carboxythiazole

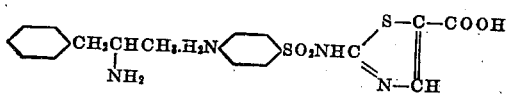

Fifteen parts of 2-sulphanilamido-5-carboxythiazole and two parts of sodium hydroxide were mixed with 100 parts of distilled water. The resulting solution was mixed with a solution of 9.2 parts of β-aminopropylbenzene sulphate in 100 parts of water and 250 parts of water were added to the mixture. Upon standing, a crystalline deposit, the salts of β-aminopropylbenzene and 2-sulphanilamido-5-carboxythiazole formed rapidly. The crystals were removed from the mother liquor by suction filtration, washed with a small amount of water and dried. They melted at 153–4° C. Recrystallization from water did not alter the melting point.

Example 5

Salts of 2-aminoheptane and 2-sulphanilamido-5-carboxythiazole

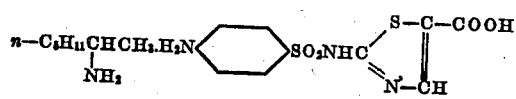

Twenty parts of 2-sulphanilamido-5-carboxythiazole and 7.7 parts of 2-amino-heptane were dissolved in 300 parts of boiling distilled water. Upon cooling, the salts of 2-aminoheptane and 2-sulphanilamido-5-carboxythiazole crystallized from the solution. The crystals were separated from the mother liquor by suction filtration, washed with a small amount of water and dried. They melted at 134–5° C. Recrystallization from water did not alter the melting point.

Example 6

Salts of l-α-hydroxy-β-methylamino-3-hydroxy ethylbenzene and 2-sulphanilamido-5-carboxythiazole

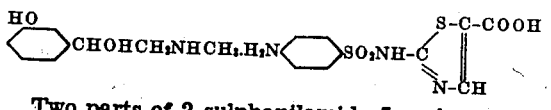

Two parts of 2-sulphanilamido-5-carboxythiazole and 1.12 parts of l-α-hydroxy-β-methylamino-3-hydroxy ethylbenzene were dissolved in 20 parts of warm absolute alcohol. The solution was cooled, then diluted with about three times its volume of anhydrous ether, which caused separation of a sticky, viscous oil. The oil was rubbed with a glass rod, decanting the supernatant liquid and replacing it with anhydrous ether several times, and gradually changed to a white powder. This powder, the desired salts, is very hygroscopic and freely soluble in water.

Example 7

Solution of salts of l-α-hydroxy-β-methylamino-3-hydroxy ethylbenzene and 2-sulphanilamido-5-carboxythiazole

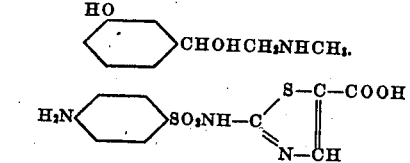

While it is possible to prepare and isolate the salts of 2-sulphanilamido-5-carboxythiazole with all the common mucosa shrinking agents, it is sometimes more convenient to prepare the aqueous solution for use without isolating the active salts. The following example illustrates such a preparation.

To 100 parts of 0.25 per cent aqueous solution of l - α - hydroxy - β - methylamino - 3 - hydroxy ethylbenzene hydrochloride are added 5 parts of 2-sulphanilamide-5-carboxythiazole. The mixture is stirred and 10% aqueous sodium hydroxide is added gradually until the resulting solution has a pH of 6 to 7. The 2-sulphanilamido-5-carboxythiazole is completely dissolved at this pH with the formation of a solution of the salts of l-α-hydroxy-β-methylamino-3-hydroxy ethylbenzene and 2-sulphanilamido-5-carboxythiazole, and the sodium salt of 2-sulphanilamido-5-carboxythiazole.

Example 8

Solution of salts of p-hydroxy-α-methyl-β-phenylethylamine and 2-sulphanilamido-5-carboxythiazole

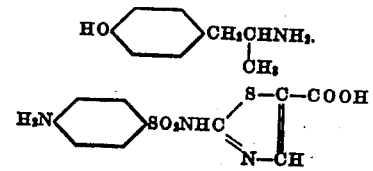

7.5 parts of 2-sulphanilamido-5-carboxythiazole were suspended in 150 parts of a 1% solution of the hydrobromide of p-hydroxy-α-methyl-β-phenylethylamine containing as preservative 1 part in 100,000 of sodium ethyl-mercuri-thiosalicylate. Ten percent aqueous sodium hydroxide solution was added gradually to the mixture with stirring. The suspended solid gradually dissolved and a clear solution was finally obtained, the pH of which was 6.1. Enough additional sodium hydroxide solution was added to bring the final pH to 6.5, 10.9 parts of the alkali being required for the entire process.

*Example 9*

Solution of salts of 2-(1-naphthylmethyl)-imidazoline and 2-sulphanilamido-5-carboxythiazole

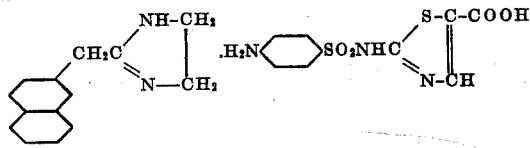

5 parts of 2-sulphanilamido-5-carboxythiazole were suspended in 100 parts of a 0.05% solution of 2-(1-naphthylmethyl)-imidazoline hydrochloride which contained in addition 0.742% potassium biphosphate, 0.223% potassium chloride, 0.258% sodium phosphate, 0.077% sodium chloride, 0.014% propyl p-hydroxybenzoate and 0.026% methyl p-hydroxybenzoate. Ten per cent aqueous sodium hydroxide solution was then added slowly with stirring. The suspended solid gradually dissolved, and a clear solution of pH about 6.2, was obtained after addition of about 6.4 parts of the alkali solution. The solution was adjusted to pH 6.5 by further addition of sodium hydroxide solution, about 0.4 parts additional being required.

The foregoing examples are merely illustrative of suitable methods for preparing representative salts of the class and are not intended to limit the scope of the invention. Salts of 2-sulphanilamido-5-carboxythiazole can be prepared by the methods described with any of the other common vasoconstrictors as shown in the preceding examples as well as alpha-hydroxy-β-methylamino-4-hydroxy ethylbenzene, β-methylamino-4-hydroxypropylbenzene.

Our experiments show as indicated by the preceding examples that certain of the salts are freely soluble in water while others are of limited solubility. These characteristics make some adaptable for use in aqueous solutions while the others are better used in a solid state.

Having thus described our invention, we claim:

1. An aqueous solution containing a 2-sulphanilamido-5-carboxythiazole salt of a basic vasoconstrictor and an alkali metal salt of 2-sulphanilamido-5-carboxythiazole.

2. An aqueous solution containing a 2-sulphanilamido-5-carboxythiazole salt of a basic vasoconstrictor and an alkali metal salt of 2-sulphanilamido-5-carboxythiazole, said salt being present in concentrations of 0.05% to 8% and the alkali metal salt of 2-sulphanilamido-5-carboxythiazole in concentrations up to 20%.

3. An aqueous solution containing a 2-sulphanilamido-5-carboxythiazole salt of a basic vasoconstrictor and an alkali metal salt of 2-sulphanilamido-5-carboxythiazole, said salt being present in concentrations of 0.05% to 8% and the alkali metal salt of 2-sulphanilamido-5-carboxythiazole in concentrations up to 20%, the solution having a pH value greater than 4 and less than 8.5.

4. An aqueous solution containing a 2-sulphanilamido-5-carboxythiazole salt of a basic vasoconstrictor and an alkali metal salt of 2-sulphanilamido-5-carboxythiazole and a preserving agent, said salt being present in concentrations of 0.05% to 8% and the alkali metal salt of 2-sulphanilamido-5-carboxythiazole in concentrations up to 20%.

5. A 2-sulphanilamido-5-carboxythiazole salt of a basic vasoconstrictor.

6. An aqueous solution of a 2-sulphanilamido-5-carboxythiazole salt of a basic vasoconstrictor, said solution having a pH value greater than 4 and less than 8.5.

7. A 2-sulphanilamido-5-carboxythiazole salt of a vasoconstrictor having a salt-forming amine group.

8. A 2-sulphanilamido-5-carboxythiazole salt of a phenylalkylamine having vasoconstrictor action.

9. A 2-sulphanilamido-5-carboxythiazole salt of an alkylamine having vasoconstrictor action.

10. A 2-sulphanilamido-5-carboxythiazole salt of an imidazoline having vasoconstrictor action.

11. The 2-sulphanilamido-5-carboxythiazole salt of alpha-hydroxy-beta-methylamino-3-hydroxyethylbenzene.

12. The 2-sulphanilamido-5-carboxythiazole salt of para-hydroxy-alpha-methyl-beta-phenylethylamine.

13. The 2-sulphanilamido-5-carboxythiazole salt of desoxyephedrine.

PHILIP S. WINNEK.
EARL R. BOCKSTAHLER.